No. 675,857. Patented June 4, 1901.
C. R. KELLER & D. O. JACKSON.
SPRING MOTOR.
(Application filed July 5, 1900.)
(No Model.) 3 Sheets—Sheet 1.
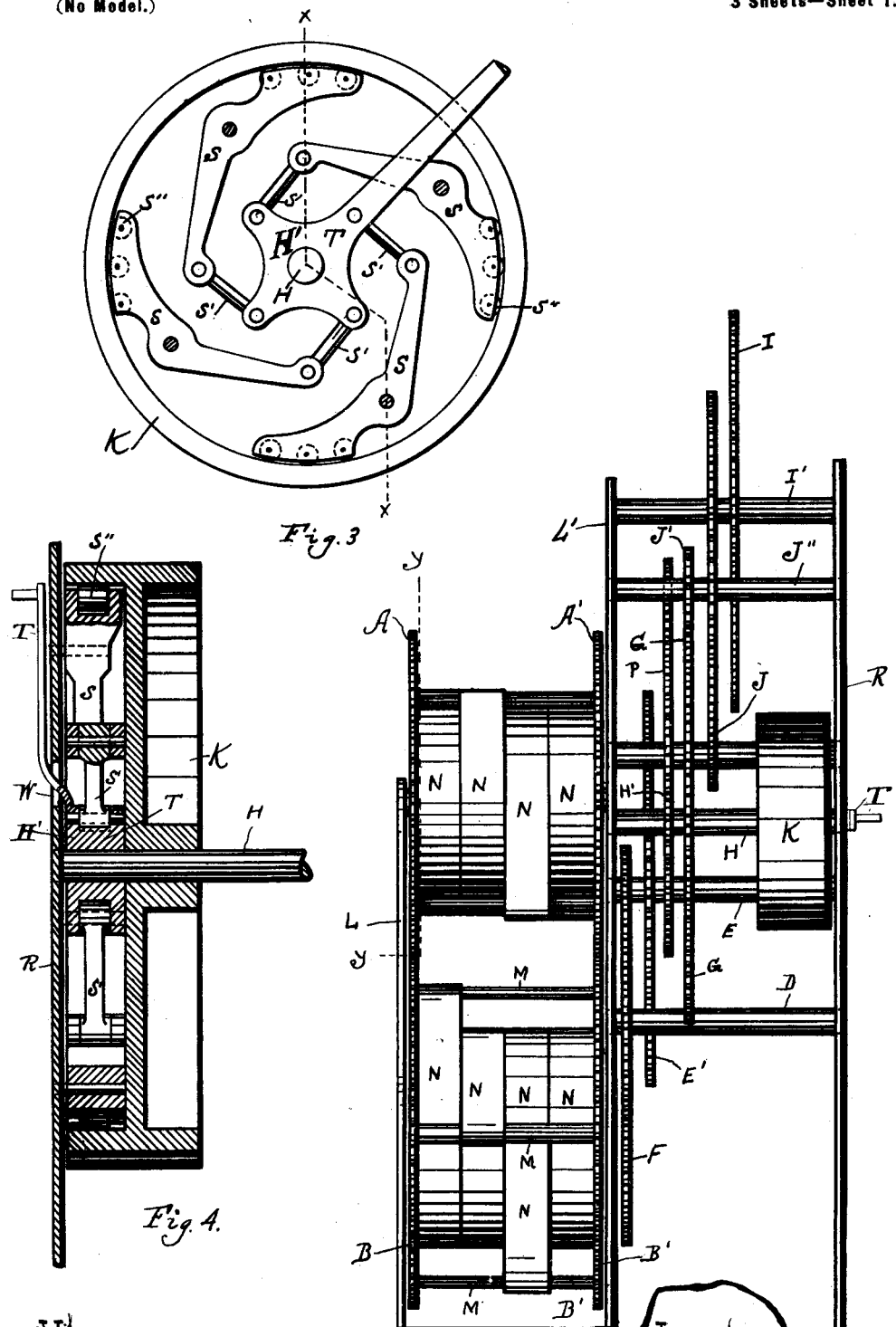

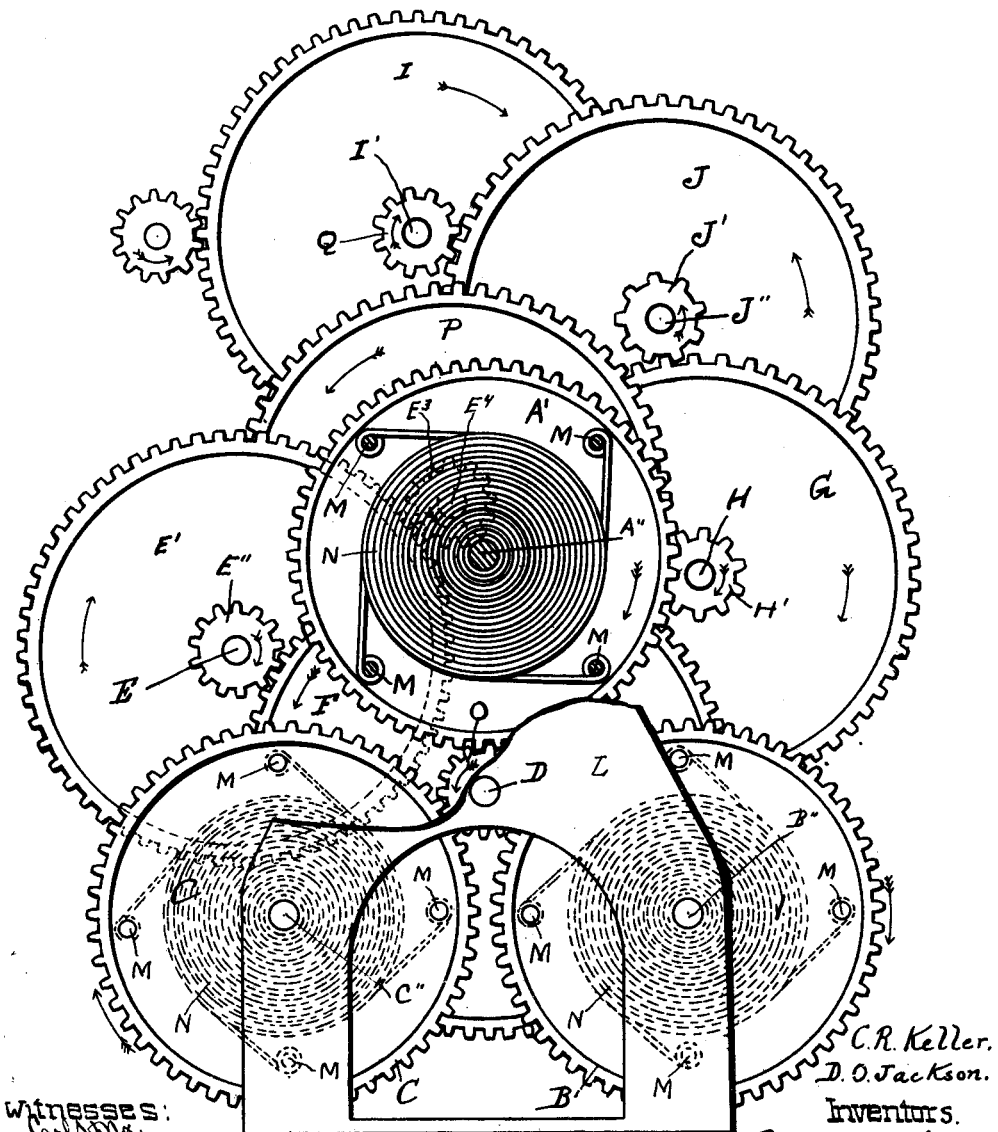

No. 675,857. Patented June 4, 1901.
C. R. KELLER & D. O. JACKSON.
SPRING MOTOR.
(Application filed July 5, 1900.)
(No Model.) 3 Sheets—Sheet 3.

WITNESSES:
Carl Noe
C. Theobald

C. R. Keller,
D. O. Jackson,
INVENTORS
By R. J. McCarty
their ATTORNEY.

UNITED STATES PATENT OFFICE.

CHARLES R. KELLER AND DORA O. JACKSON, OF MIAMISBURG, OHIO; SAID JACKSON ASSIGNOR TO SAID KELLER.

SPRING-MOTOR.

SPECIFICATION forming part of Letters Patent No. 675,857, dated June 4, 1901.

Application filed July 5, 1900. Serial No. 22,518. (No model.)

*To all whom it may concern:*

Be it known that we, CHARLES R. KELLER and DORA O. JACKSON, citizens of the United States, residing at Miamisburg, in the county of Montgomery and State of Ohio, have invented certain new and useful Improvements in Spring-Motors; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in spring-motors for driving light machinery.

The object of the invention is to provide means for transmitting to the primary driving-wheels a maximum amount of power from three separate batteries of springs, each of said batteries comprising three or more springs, as will be hereinafter fully described in the specification and pointed out in the claims.

Figure 6:
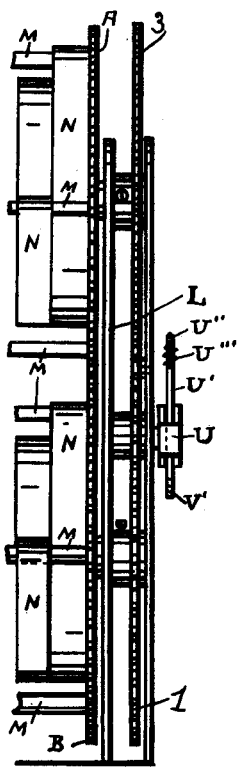
Figure 5:
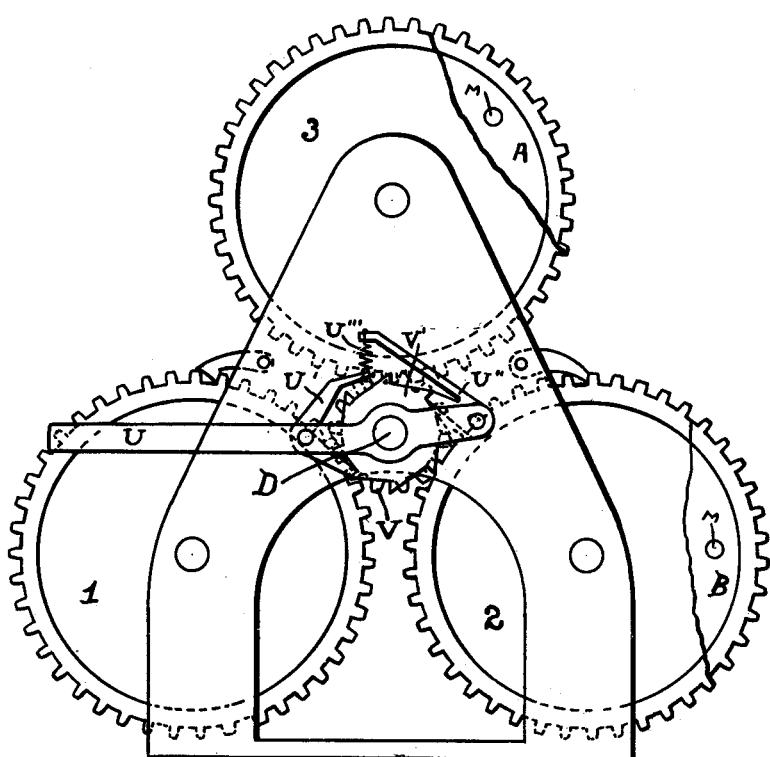
Figure 7:
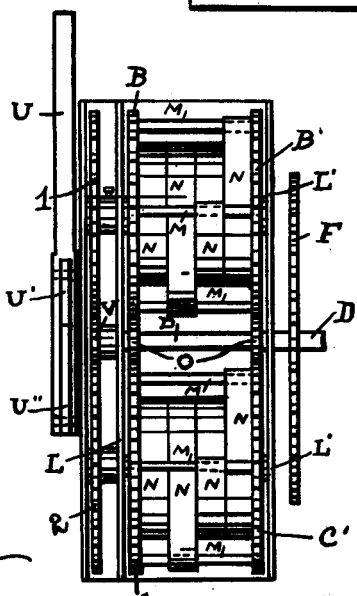

Referring to the accompanying drawings, Figure 1 represents a side elevation of the motor. Fig. 2 is a front sectional elevation on the line Y Y of Fig. 1. Fig. 3 is an elevation of the fly-wheel and of the brake or clutch mechanism. Fig. 4 is a sectional view on the line $x$ $x$ of Fig. 3. Fig. 5 is a front elevation of the winding mechanism. Fig. 6 is a side elevation of the same. Fig. 7 is a top plan view of the same.

Referring to Fig. 2, the arrows indicated on the several spur-wheels show the direction in which said wheels move when under the influence of the several batteries of springs. The primary driving-wheels are arranged in pairs and consist of wheels A A', B B', C C', which are loosely mounted on shafts A'', B'', and C'', that are loosely mounted in the upright plates L and L'. Each set of said primary driving-wheels is connected by four parallel bars M.

N designates a series of convolute springs, of which there are four for each set of the driving-wheels A A', B B', C C'. By transmitting the power to each end of the shafts supporting the springs and the wheels such power is equalized on the lantern-frames. This is an essential feature, owing to the manner of applying the springs, which, it will be observed, comprise four for each battery. One end of each of said springs is connected to the stationary shafts upon which said wheels are mounted. As shown in Fig. 1, it will be seen that the said springs extend along each of said shafts and are independent of each other. The outer ends of said springs are connected to the bars M, one in advance of the other. It will be observed that the bars M, being connected to and between the wheels, will turn with said wheels when the latter are under the influence of the springs.

O is a primarily driven pinion, of which there are two rigidly mounted on shaft D. These pinions are inclosed between and geared to the wheels A A', B B', C C'. On shaft D there is a large spur-wheel F, which gears with a pinion E'' on shaft E. The latter shaft drives a large gear-wheel E', which meshes a pinion $E^3$ on shaft $E^4$. The latter shaft has upon it a large gear-wheel P, which drives pinion H' on shaft H. On the latter shaft there is a speed-increasing wheel G, and also a fly-wheel K. Wheel G gears with a speed-decreasing pinion J' on shaft J'', which also has a speed-increasing wheel J, which meshes with a speed-decreasing pinion Q on shaft I'. Power is finally transmitted from the machine through a speed-increasing wheel I on the shaft I'. It will thus be seen that the train of gearing consists of a series of spur pinions and wheels, through which the speed is successively decreased and increased as it is transmitted from the several batteries of springs hereinbefore described.

Referring to Figs. 3 and 4, the speed of the machine is regulated and controlled by clutch mechanism, which is mounted on the wall R of the frame. This mechanism consists of a series of levers S, which are pivoted to the wall R and are connected by links S' to a common hand-operating lever T, which is fulcrumed on shaft H. Each of said levers has a series of rollers S'', that may be brought in contact with the inner rim of the wheel K by manipulating the lever T. The lever T is secured to the piece H', to which the levers S are pivoted, as shown in Figs. 3 and 4, and projects through a segmental slot W in the wall R and is operated on the outside of said wall. The position of the lever T may be varied as found most expedient. The said lever may be secured by any suitable means in any desirable position, either to maintain the rollers in close contact with the rim of the wheel K or a loose contact with said rim or entirely free from contact with said rim. By means of this checking or clutch mechanism the motor may be maintained under absolute control and the springs prevented from unnecessary expansion.

The winding mechanism is shown in Figs. 5, 6, and 7, and consists of a hand-lever U, which is fulcrumed on the shaft D, and has pawls U' and U'', which are pivoted thereto and which are controlled by a spring U'''. These pawls engage with a ratchet-wheel V', which is fastened to the hub of a winding-pinion V, said winding-pinion being loose on the shaft D. The pinion V meshes with three large winding-wheels 1, 2, and 3, which are fixed to the shaft upon which the wheels A A', B B', C C' are mounted, so that in turning the winding-pinion V by the ratchets all of the springs are simultaneously wound.

Having fully described our invention, we claim—

In a spring-motor, the combination of three sets of primary driving-wheels, each set consisting of two wheels which are connected near their peripheries by a plurality of parallel bars, each set of wheels being loosely mounted on its respective shaft, a series of clock-springs occupying the space between the wheels of each set, the inner ends of said springs being connected to the shaft upon which each set of wheels is mounted, and the outer ends of said springs being attached to the parallel bars that connect the wheels of each set, pinions engaging with the wheels of each set, a winding-pinion V on the shaft of said pinions, winding spur-wheels 1, 2, and 3 tight on the shafts of each set of primary driving-wheels and engaging the winding-pinion V, and ratchets for turning said winding-pinion V to simultaneously wind all of the springs from a central point, substantially as shown and described.

In testimony whereof we affix our signatures in presence of two witnesses.

CHARLES R. KELLER.
DORA O. JACKSON.

Witnesses:
R. J. McCARTY,
WM. B. IDDINGS.